Patented May 29, 1945

2,377,085

UNITED STATES PATENT OFFICE 2,377,085

UNSATURATED CHLOROCARBONATES AND METHOD OF PREPARATION

Frederick E. Küng, Akron, Ohio, assignor to Pittsburgh Plate Glass Company, Pittsburgh, Pa., a corporation of Pennsylvania No Drawing. Application September 29, 1943, Serial No. 504,292

6 Claims. (Cl. 260—463)

This invention relates to new vinyl type esters and the methods of preparation thereof. The vinyl esters are generally difficult to synthesize and preparation by direct esterification of the acid is not possible since vinyl alcohol is not known to exist in free state. Vinyl carbonates and vinyl haloformates have not been prepared previously. The purpose of this invention is to provide a method of preparing vinyl chloroformate and the substituted vinyl chloroformates.

I have invented a process by which vinyl haloformate may be prepared in good yields by the pyrolysis of a bis (haloformate) of a glycol. More particularly, the process is directed to the thermal decomposition of the bis (haloformates) of alkylene glycols having the two hydroxy groups on adjacent carbon atoms as in ethylene glycol, 1,2-propylene glycol, 2,3-butylene glycol and 1,2-butylene glycol. Of the bis (haloformates), the chloroformates are conveniently made by reacting a glycol with phosgene while maintaining the temperature below 30° C. in order to avoid the formation of cyclic carbonate esters. Other bis (haloformates) such as glycol bis (bromoformate) can be pyrolyzed to yield the corresponding vinyl or substituted vinyl haloformate.

The pyrolysis or thermal decomposition of a glycol bis (chloroformate) such as ethylene glycol bis (chloroformate) is effected by heating the compound to an elevated temperature, preferably between 300 and 600° C. The molecule is split into carbon dioxide, hydrochloric acid and several different by-products in addition to vinyl chloroformate. The relative proportions of the various by-products may be controlled by regulating the temperature of the cracking furnace and the time during which the dichloroformate is retained therein.

Either batch or continuous procedures may be employed. The reaction is particularly adapted to a process in which the liquid bis (haloformate) is introduced continuously and the reaction products are continuously withdrawn.

Many types of apparatus may be utilized in the practice of the invention. A simple straight tube of glass or other inert impervious material may be used for the cracking chamber. Such a tube is preferably used in a horizontal or slightly inclined position. Heat is provided by any conventional means such as a muffle or tube furnace, preferably electric to facilitate temperature maintenance. The bis (haloformate) can be introduced from a reservoir by gravity feed through a flow meter into the reaction tube. Thermal decomposition and vaporization take place in a relatively short period of time at temperatures between 300 and 600° C. The products of pyrolysis are withdrawn as gases and the principal portion condensed by cooling in water cooled condensers or by contact with other cooling mediums. Since several of the constituents are relatively low boiling liquids manifesting appreciable vapor pressures at 0° C., it is desirable to further cool the gas stream with an acetone-dry ice mixture or other extremely cold medium to recover the volatile constituents from the fixed gases.

The condensed products may be separated by well known distillation methods. When glycol bis (chloroformate) is pyrolyzed the boiling points of the principal product constituents are sufficiently far apart to permit effective separation by ordinary fractionating apparatus. Besides vinyl chloroformate, ethylene dichloride, ethylidene chloride, vinyl chloride, 1-chloroethyl chloroformate and 2-chloroethyl chloroformate have been separated and identified.

The vinyl and substituted vinyl haloformates are useful in the preparation of the corresponding carbonate esters and especially for the substitution of the vinyl carbonate radical on a hydroxyl group in organic synthesis procedures. The use of vinyl chloroformate in the synthesis of polyunsaturated esters capable of polymerization to form hard transparent resinous compositions is of particular significance.

Vinyl chloroformate, especially when pure, may polymerize upon standing at room temperature or upon being subjected to distillation. Polymerization may be prevented or minimized by the addition thereto of conventional polymerization inhibitors, such as metallic copper or copper salts, hydroquinone, pyrogallol and various amino compounds.

The vinyl carbonate esters are prepared by reacting vinyl haloformate or substituted vinyl haloformate with a hydroxy compound in the presence of an alkaline reagent to form mixed carbonates. Thus alcohols, phenols, glycols, hydroxy acids, etc. may be reacted to form the corresponding vinyl carbonate derivatives.

Further details of the preparation of the new chloroformates are set forth in the following examples:

Example I

Liquid ethylene glycol bis (chloroformate) (7975 g.) was passed into a horizontal glass tube (1" diameter x 24" length) heated to 460° C., at a rate of 25 cc. per minute. The gaseous product was withdrawn through a connected water cooled condenser into a receiving flask cooled with an acetone-dry ice mixture. The condensate recovered (5720 g.) was placed in a distillation flask and the pressure gradually reduced to 25–30 mm. at 20° C. A small fraction of liquid ethylidene chloride was condensed and recovered from the vapors. Distillation was continued at atmospheric pressure and the following fractions were separated:

| | Grams |
|---|---|
| 1. Below 64° C | 312 |
| 2. 64° C. to 80° C | 516 |
| 3. 80° C. to 90° C | 498 |
| 4. Residue | 4,235 |

Each of these fractions were redistilled. Fraction 1 was found to contain substantial quantities of ethylidene chloride while fraction 3 was almost entirely ethylene dichloride. Fraction 2 upon redistillation between 68 and 69° C. at 735 mm. yielded a colorless liquid having an index of refraction of 1.4042. It was found to contain 32.7 percent of chloroformate chlorine (theoretical for vinyl chloroformate 33.3 percent) and was identified as vinyl chloroformate.

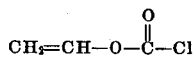

The residue (fraction 4) consisted principally of undecomposed ethylene glycol bis (chloroformate). Upon distillation of the residue at 76 mm. a fraction boiling below 100° C. was recovered which, when further fractionated, yielded substantial quantities of the following compounds:

1-chloroethyl chloroformate B. P. 57–59° C. (76 mm.)
2-chloroethyl chloroformate B. P. 89–90° C. (76 mm.)

These compounds were passed through the same pyrolysis apparatus where they were cracked and the decomposition products condensed and recovered. The condensate was fractionated and an additional quantity of vinyl chloroformate was thereby obtained.

*Example II*

A 3″ diameter glass tube 18″ long was packed with glass beads and suspended horizontally in a muffle type furnace. At one end an inlet was provided with a dropping funnel and a flowmeter, while at the opposite end the tube was connected to a water cooled condenser and receiver followed by a condenser cooled with a salt-ice mixture and finally by a trap containing a dry ice-acetone mixture. The furnace was heated to maintain the temperature in the glass tube at 425° C.

Ethyleneglycol bis (chloroformate) was introduced into the reaction chamber at the rate of 100 cc. per minute. Condensate recovered from the cold water condenser was topped to remove a fraction boiling below 90° C. and the liquid residue containing ethylene glycol bis (chloroformate) was returned for further pyrolysis. The toppings were combined with the condensate from the second condenser and the mixture fractionated in a reflux distillation column. The following compounds were recovered in the proportions specified below:

| | Parts by weight |
|---|---|
| Vinyl chloroformate | 5 |
| Ethylidene chloride | 2 |
| Ethylene dichloride | 4 |

A small proportion of vinyl chloride was recovered from the acetone-dry ice trap.

*Example III*

The procedure of Example I was repeated using 1,2-propylene glycol bis (chloroformate) in place of the ethylene glycol bis (chloroformate). The compound methylvinyl chloroformate was found to be present in substantial quantities in the liquid condensate from the pyrolysis reaction. One fraction separated by distillation was found to have a boiling point of 104–106° C. and corresponded to 97 percent 2-methylvinyl chloroformate. Its molecular structure was established by conversion to propionaldehyde.

Although the invention has been described by reference to certain specific embodiments thereof, such details are not intended to be limitations on the scope of the invention as defined in the following claims.

I claim:

1. A method of preparing compounds of the group consisting of vinyl haloformates and alkyl substituted vinyl haloformates which comprises pyrolyzing bis (haloformates) of alkylene glycols which have the two hydroxy groups on adjacent carbon atoms.

2. The method of preparing unsaturated chloroformates having the unsaturated linkage in a straight carbon chain and attached to the carbon atom adjacent to the chloroformate group which method comprises pyrolyzing bis (chloroformates) of alkylene glycols which have the two hydroxy groups on adjacent carbon atoms.

3. A method of preparing vinyl chloroformate which comprises pyrolyzing ethylene glycol dichloroformate.

4. A compound having the structure:

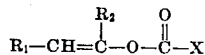

in which $R_1$ and $R_2$ are radicals of the group consisting of hydrogen and lower alkyl groups and X is a halogen.

5. Vinyl chloroformate.
6. 2-methylvinyl chloroformate.

FREDERICK E. KÜNG.